3,651,059
DERIVATIVES OF NORBORNENE-2,3-DICARBOXY-IMIDE AND OF NORBORNANE-2,3-DICARBOXY-IMIDE AND METHOD FOR PREPARING THEM
Enrico Serino and Demetrio Antoniu, Rome, Mario Magi, Siena, and Fabrizio Ganzina and Fabio Samueli, Rome, Italy, assignors to S.I.R. Laboratori Chimico-Biologici S.p.A., Tor Sapienza, Rome, Italy
No Drawing. Filed June 26, 1969, Ser. No. 836,994
Claims priority, application Italy, July 2, 1968, 18,510/68
Int. Cl. C07d 27/52
U.S. Cl. 260—247.2 A      13 Claims

ABSTRACT OF THE DISCLOSURE

A new series of $\Delta^5$-norbornene-2,3-dicarboximide derivatives of the general formula:

$$\underset{6}{\overset{5}{\diagup}}\diagdown\overset{CO}{\underset{CO}{\diagdown\diagup}}N-\underset{R_2}{\overset{R_1}{\underset{|}{C}}}-(CH_2)_n-CO-Am \quad (1)$$

and 5,6-dihydroanalogs are disclosed, and processes for their preparation.

---

This invention refers to a new series of $\Delta^5$-norbornene-2,3-dicarboximide derivatives of the formula $$\underset{6}{\overset{5}{\diagup}}\diagdown\overset{CO}{\underset{CO}{\diagdown\diagup}}N-\underset{R_2}{\overset{R_1}{\underset{|}{C}}}-(CH_2)_n-CO-Am \quad (1)$$

and the 5,6-dihydroanalogs thereof, wherein:

$n$ is an integer of from 0 to 5;
$R_1$ and $R_2$ may be the same or different and are hydrogen, alkyl having from 1 to 4 carbon atoms, aryl or carboxy groups; and
Am is the residue of a primary or secondary amine Am-H, having from 1 to 12 carbon atoms.

In a preferred form, Am is an amine residue selected from the group consisting of unsubstituted or HO-alkyl-, alkoxy-substituted N-pyrrolidinyl, N-piperidinyl-, N-morpholinyl, N-(4-methyl)piperazinyl residues, amino, anilino and dialkylamino.

The compounds falling under the general Formula 1 occur generally as crystalline colorless solids and are prepared by reacting acyl halides of the Formula 2

$$\underset{6}{\overset{5}{\diagup}}\diagdown\overset{CO}{\underset{CO}{\diagdown\diagup}}N-\underset{R_2}{\overset{R_1}{\underset{|}{C}}}-(CH_2)_n-COCl \quad (2)$$

(wherein $R_1$, $R_2$ and $n$ have the above-stated meanings)—with primary or secondary amines of formula Am-H, wherein Am has the above stated meaning, in an inert organic solvent (for instance, benzene) and in the presence of an inert hydrochloric acid acceptor (for instance, triethylamine); or by allowing halogen-derivatives of the Formula 3

$$X-\underset{R_2}{\overset{R_1}{\underset{|}{C}}}-(CH_2)_n-CO-Am \quad (3)$$

wherein X is halogen, $R_1$, $R_2$, $n$, Am have the above-stated meanings, to react with the sodium or potassium salt of $\Delta^5$-norbornene-2,3-dicarboximide, employing ethyl alcohol as the solvent.

The compounds wherein $R_2$ is a carboxy group are prepared by reaction of $$\underset{}{\diagup}\diagdown\overset{CO}{\underset{CO}{\diagdown\diagup}}N-\underset{CO-\!\!\!\!-O}{\overset{R_1}{\underset{|}{C}}}-(CH_2)_n-CO$$

(wherein $R_1$ and $n$ are as above defined) with a primary or secondary amine of the formula Am-H wherein Am has the above-defined meaning.

The norbornane-2,3-dicarboximide derivatives are prepared in an analogous way by substituting the cited intermediate products with the corresponding saturated compounds.

The products falling under Formula 2 are in turn prepared by reacting the $\Delta^5$-norbornene-2,3-dicarboxyanhydride or the $\Delta^5$-norbornane-2,3-dicarboxyanhydride and the suitable amino acid; the obtained carboxyl derivative is isolated and converted into the corresponding chloride by means of thionyl chloride.

EXAMPLE 1: (SIR 187, 283, 186)

0.03 mole of $\Delta^5$-norbornene-2,3-dicarboximide in 50 ml. ethanol is added under stirring to a solution of 0.03 mole sodium ethoxide in 30 ml. ethanol. It is stirred for some minutes at room temperature, then a solution of 0.03 mole chloroacetopiperidide in 30 ml. ethanol is added. The whole mixture is heated under reflux for three hours, ethanol is evaporated, the residue is extracted with chloroform and the combined extracts, after alkaline and aqueous washings, are dried and evaporated. A solid residue is obtained which, after crystallization from ethanol yields the piperidide of $\Delta^5$-norbornene-2,3-dicarboximido-acetic acid (SIR 187).

Analogously, the 4-methylpiperidide of the $\Delta^5$-norbornene-2,3-dicarboximido-acetic acid (SIR 283) is prepared, as well as the N,N-diethylamide of the $\Delta^5$-norbornene-2,3-dicarboximido-acetic acid (SIR 186).

EXAMPLE 2: (SIR 306—SIR 284)

(a) 20 g. of $\Delta^5$-norbornene-2,3-dicarboxyanhydride and 10 g. glycine are melted and kept at 190° C. for 30 minutes. The still hot mass is taken up with 10 ml. ethanol, and 40 ml. $H_2O$ are added. By cooling, crystallization of $\Delta^5$-norbornene - 2,3 - dicarboximido-acetic acid (M.P. 151°–3° C.) occurs.

(b) 19 g. $\Delta^5$-norbornene-2,3-dicarboximido-acetic acid are treated with 100 ml. thionyl chloride at the boiling temperature for 15 minutes; the thionyl chloride excess is evaporated and the residue is taken up with 20 ml. chloroform and 40 ml. isooctane. $\Delta^5$-norbornene-2,3-dicarboximido-acetyl chloride (M.P. 110°–113° C.) crystallizes.

(c) 0.04 mole $\Delta^5$-norbornene-2,3-dicarboximido-acetyl chloride dissolved in chloroform is added under stirring and cooling to 0.09 mole pyrrolidide in chloroform. After reflux boiling for 1 hour, it is washed with an $NaHCO_3$ saturated solution, with 10% HCl and with $H_2O$.

After drying, filtration with carbon and evaporation the residue is crystallized from ethanol or ethanol-ether. The piperidide of the $\Delta^5$-norbornene-2,3-dicarboximido-acetic acid (SIR 306) is so obtained. In an analogous way the 2',6'-dimethylpiperidide of the $\Delta^5$-norbornene-2,3-dicarboximido-acetic acid (SIR 284) is prepared.

EXAMPLE 3: (SIR 244)

0.02 mole of $\Delta^5$-norbornene-2,3-dicarboximide in 50 ml. ethanol is added under stirring to a solution of 0.02 mole sodium in 30 ml. ethanol.

After stirring for some minutes at room temperature, a solution of 0.02 mole α-chloro-α-phenylacetopiperidide in 30 ml. ethanol is added.

The mixture is heated under reflux for 8 hours and then filtered through carbon. Ethanol is evaporated and the residue is extracted with chloroform.

After alkaline and water washings, the combined extracts are dried and evaporated. An oily residue is obtained which crystallizes by treatment with ethyl ether. The piperidide of the 2-(Δ⁵-norbornene - 2,3 - dicarbox-imido)-2-(phenyl)acetic acid (SIR 244) is obtained; M.P. 184°–6° C.

EXAMPLE 4: (SIR 307)

0.032 mole Δ⁵-norbornene-2,3-dicarboximide in 50 ml. ethanol is added under stirring to a solution of 0.032 mole of sodium ethoxide in 30 ml. ethanol.

After stirring for some minutes at room temperature, a solution of 0.032 mole 2-bromo-propionamide is added, the mixture is heated under reflux for three hours, ethanol is evaporated, and the residue is taken up with an NaHCO₃ saturated solution. The insoluble portion is separated on the filter and after water washings is crystallized from ethanol. 2-(Δ⁵-norbornene-2,3-dicarboximido)-propionamide (SIR 307) is obtained; M.P. 219°–221° C.

EXAMPLE 5: (SIR 310)

(a) 0.207 mole Δ⁵-norbornene-2,3-dicarboxyanhdride and 0.225 mole 2-aminopropionic acid are melted and kept at 170° C. for 30 minutes. To the still warm mixture, 20 ml. ethanol and 80 ml. H₂O are added. 3-(Δ⁵-norbornene - 2,3 - dicarboximido)-propionic acid crystallizes, which after recrystallization from 15% ethanol melts at 145°–147° C.

(b) 0.67 mole 3-(Δ⁵ - norbornene-2,3-dicarboximido)-propionic acid is treated with 1.03 moles thionyl chloride for 15 minutes at the boiling temperature. After evaporation of thionyl chloride, the residue is purified with petroleum ether to obtain 15 g. 3-(Δ⁵-norbornene-2,3-dicarboximido)-propionyl chloride; M.P. 90° C.

(c) 0.4 mole 3-(Δ⁵-norbornene - 2,3 - dicarboximido)-propionyl chloride dissolved in chloroform is added under stirring and cooling to 0.09 mole piperidine in chloroform. It is boiled under reflux for 1 hour, then it is washed with an NaHCO₃ saturated solution, with 10% HCl and water.

After drying, filtration through carbon and evaporation, the residue is crystallized from ethanol. The piperidide of the 3-(Δ⁵-norbornene -2,3-dicarboximido)-propionic acid is obtained, with an M.P. of 138°–140° C. (SIR 310).

EXAMPLE 6: (SIR 194)

0.03 mole norbornane-2,3-dicarboximide in 30 ml. ethanol is added under stirring to a solution of 0.03 mole sodium ethoxide in 30 ml. ethanol.

The mixture is stirred for some minutes at room temperature, then a solution of 0.03 mole chloroacetamide in 30 ml. ethanol is added. The whole is heated under reflux for 3 hours, ethanol is evaporated and the residue is warm-extracted with chloroform, while filtering it in the warm. From the filtrate, norbornane-2,3-dicarboximidoacetamide crystallizes, with M.P. 180°–182° C. (SIR 194).

EXAMPLE 7: (SIR 193—SIR 195)

0.03 mole norbornane-2,3-dicarboximide in 50 ml. ethanol is added under stirring to a solution of 0.03 mole sodium ethoxide in 30 ml. ethanol. After stirring for some minutes at room temperature, a solution of 0.03 mole chloroacetomorpholide in 30 ml. ethanol is added. The whole is heated under reflux for 3 hours, ethanol is evaporated, the residue is extracted with chloroform and the combined extracts, after alkaline and aqueous washings, are dried and evaporated. A residue is obtained, which after crystallization from ethanol yields the morpholide of the norbornane-2,3-dicarboximido-acetic acid with M.P. 160–162° C. (SIR 193).

In an analogous way the anilide of the norbornane-2,3-dicarboxyimido-acetic acid is prepared (SIR 195).

EXAMPLE 8: (SIR 191)

(a) 20 g. norbornane-2,3-dicarboxyanhydride and 10 g. glycine are melted and kept at 190° C. for 30 minutes. The still warm mass is taken up with ethanol, 40 ml. water are added and by cooling, crystallization of norbornane - 2,3 - dicarboximido-acetic acid occurs, M.P. 170°–173° C. (crystallizd from ethanol-water 1:4).

(b) 25 g. norborane-2,3-dicarboximido-acetic acid are treated with 125 ml. thionyl chloride for 15 minutes at the boiling temperature; the excess of thionyl chloride is evaporated and the residue is taken up with 20 ml. chloroform and 40 ml. isooctane.

Crystallization of norbornane-2,3-dicarboximido-acetyl chloride occurs.

(c) 0.04 mole norbornane - 2,3-dicarboximido-acetyl chloride, dissolved in choloroform, is added under stirring and cooling to 0.09 mole diethylamine in chloroform. After boiling under reflux for 1 hour, it is washed with an NaHCO₃ solution, with 10% HCl, and with water. After drying, filtration through carbon and evaporation, the residue is crystallized from ethanol-ethyl ether.

The N,N-diethylamide of the norbornane-2,3-dicarboximido-acetic acid with M.P. 112–114° C. (SIR 191) is obtained.

The characteristics of the described products are summarized in the Tables 1 and 2.

TABLE 1.—DERIVATIVES OF Δ⁵-NORBORNENE-2,3-DICARBOXIMIDE

General formula:

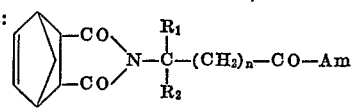

|  |  |  |  |  |  | Analysis (percent) | | | | | |
|---|---|---|---|---|---|---|---|---|---|---|---|
|  |  |  |  |  |  | Calculated | | | Found | | |
| Compound | n | R₁ | R₂ | Am | M.P. | C | H | N | C | H | N |
| SIR 283 | 0 | H | H | 4-methylpiperidinyl | 164–6 | 67.55 | 7.28 | 9.26 | 67.22 | 7.27 | 9.49 |
| SIR 284 | 0 | H | H | 2,6-dimethylpiperidinyl | 167–9 | 68.35 | 7.6 | 8.84 | 68.60 | 7.91 | 9.07 |
| SIR 187 | 0 | H | H | piperidinyl | 197–8 | 66.5 | 6.95 | 9.78 | 66.69 | 7.05 | 10.10 |
| SIR 306 | 0 | H | H | pyrrolidinyl | 208–10 | 65.6 | 6.5 | 10.2 | 65.5 | 6.65 | 10.5 |
| SIR 244 | 0 | phenyl | H | piperidinyl | 184–6 | 72.5 | 6.59 | 7.7 | 72.46 | 6.68 | 7.77 |
| SIR 307 | 0 | methyl | H | —NH₂ | 219–21 | 61.5 | 5.95 | 11.95 | 61.77 | 6.23 | 12.20 |
| SIR 310 | 1 | H | H | piperidinyl | 138–40 | 67.5 | 7.3 | 9.27 | 67.73 | 7.38 | 9.40 |
| SIR 186 | 0 | O | H | —N(Et)₂ | 167–8 | 65.0 | 7.24 | 10.1 | 64.96 | 7.44 | 10.40 |

TABLE 2.—DERIVATIVES OF NORBORNANE-2,3-DICARBOXIMIDE

General formula: 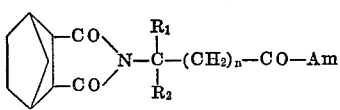

| Compound | n | $R_1$ | $R_2$ | Am | M.P. | Calculated C | Calculated H | Calculated N | Found C | Found H | Found N |
|---|---|---|---|---|---|---|---|---|---|---|---|
| SIR 194 | 0 | H | H | $NH_2$ | 180–2 | 59.5 | 6.3 | 12.6 | 59.25 | 6.48 | 12.52 |
| SIR 195 | 0 | H | H | anilino | 143–5 | 68.5 | 6.04 | 9.4 | 68.57 | 6.04 | 9.42 |
| SIR 191 | 0 | H | H | diethylamino | 112–4 | 64.9 | 7.91 | 10.09 | 64.71 | 8.07 | 10.29 |
| SIR 193 | 0 | H | H | morpholinyl | 160–2 | 61.6 | 6.85 | 9.59 | 61.48 | 6.78 | 9.67 |

The substances described herein have strong anticonvulsive, sedative and miorelaxing activities.

An important characteristic of the cited compounds is their lower toxicity. $LD_{50}$ is of from 1000 to 3500 mg./kg. orally, of from 700 to 1800 intraperitoneally and of from 250 to 600 intravenously. Although they are active at relatively low doses, it is possible to widely exceed the minimum active dose, i.e. from 10 to 30 times, without incurring in undesirable side actions. The compounds, which were orally administered to the rat and the mouse, have anticonvulsive (convulsions from cardiazole, electroshock, tremor from tremorine), miorelaxing (antagonism of strychnine, rotating cylinder, posture and gait), and sedative (actography) activities at doses of from 40 to 150 mg./kg. (in the rat) and of from 60 to 200 mg./kg. (in the mouse), respectively.

The compounds endovenously administered to the mouse show the same activities at doses varying from 5 to 30 mg./kg. The anticonvulsive, sedative and miorelaxing properties are maintained when the substances are intraperitoneally injected in the rat at doses of from 20 to 50 mg./kg.

The anticonvulsive activity has been confirmed by electro-encephalographic tests; the electro-encephalographic picture of epileptic convulsive bout caused in the rabbit by an endovenous perfusion of cardiazole is resolved by the products according to the invention, which are orally administered at doses of from 100 to 300 mg./kg.

Tests carried out on the decerebrated cat and on the "sham Rage" preparate have shown miorelaxing and sedative effects of the products endovenously administered at doses of from 35 to 100 mg./kg.

The arterial pressure, the electro-encephalogram, the respiratory frequency and volume in the dog, cat, rabbit, and rat are not substantially modified by the test substances administered orally and endovenously at doses exceeding 30 and 10 times respectively the minimum active doses.

For the most interesting products, chronic toxicity tests have been carried out on the dog and the rat by daily administering orally the products at doses exceeding 5 times the minimum effective dose. The protracted administration of the products (4 months) does not cause any modifications with respect to the weight increase, urine, diuresis, the hematologic picture and of the macroscopic and microscopic aspect of the various organs.

It is intended that the preceding dosage information is illustrative and is not meant to limit the application of the compounds of the present invention. It should be understood that the veterinarian or physician may find it advisable to adjust dosage levels in the light of individual host responses.

The compounds of the present invention may be used by the formulation in the conventional manner with a suitable carrier substance. The carrier may be either solid or liquid form and may be formulated with the compounds hereof as tablets, liquid-filled capsules, dry-filled capsules, dragées, pills, aqueous solutions, non-aqueous solutions, jellies, suppositories, syrups, suspensions, sprays, powders and the like. The compounds can, and in many cases, are admixed with suitable preservatives, coloring and flavoring agents. Some examples of the carriers which may be formulated with the compounds of the invention are gelatin capsules, sugars such as lactose and sucrose; cellulose, methyl cellulose and cellulose acetate phthalate; gelatin; talc; magnesium stearate; vegetable oils such as peanut oil, cottonseed oil, sesame oil, olive oil, corn oil and oil of theobroma; liquid petrolatum, polyethylene glycol; glycerine; sorbitol; propylene glycol; ethanol; agar; water and isotonic saline.

In preparing the compounds of the invention for pharmaceutical uses, conventional practices and precautions are used. Thus, those compositions intended for parenteral administration must be sterile; such is accomplished either by using sterile ingredients and carrying out the production under aseptic conditions, or by sterilizing the final composition as, for example, by millipore filtration. Customary care should, of course, be exercised to insure that the active compound and the carrier, preservative, flavoring agent or other additive are inert with respect to one another, and that the conditions employed in preparation of the pharmaceutical compositions do not degrade or otherwise adversely affect the compounds hereof.

The compounds of the invention can be introduced into the animal host by the oral, rectal, or parenteral route. This can be done by injecting the liquid formulations intravenously, intramuscularly, intraperitoneally, or subcutaneously; by swallowing, in the cases of the solid and liquid formulations described; by local application to the mucous membranes, in the case of jellies, suppositories, tablets and the like; or by inhalation of sprays or mists of the liquid formulations.

We claim:

1. A compound of the formula:

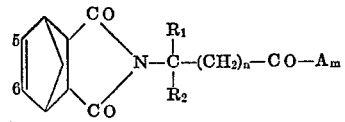

and the 5–6 dihydroanalogs thereof, wherein:

$n$ is an integer of from 0 to 5;

$R_1$ and $R_2$ may be the same or different and are hydrogen, alkyl having from 1 to 4 carbon atoms, phenyl or carboxy groups; and Am is the residue of a primary or secondary amine Am-H having from 1 to 12 carbon atoms selected from the group consisting of unsubstituted or alkyl substituted N-pyrrolidinyl, N-piperidinyl, N-morpholinyl, N-(4-methyl)-piperazinyl residues, amino, aniline and dialkylamino.

2. A compound within the scope of claim 1, having the designation piperidine of the $\Delta^5$-norbornene-2,3-dicarboximide-acetic acid.

3. A compound within the scope of claim 1, having the designation 4-methylpiperidine of the $\Delta^5$-norbornene-2,3-dicarboximidoacetic acid.

4. A compound within the scope of claim 1, having the designation N,N-diethylamide of the $\Delta^5$-norbornene-2,3-dicarboximidoacetic acid.

5. A compound within the scope of claim 1, having the designation pyrrolidide of the Δ⁵-norbornene-2,3-dicarboximidoacetic acid.

6. A compound within the scope of claim 1, having the designation (2',6-dimethyl-piperidide of the Δ⁵-norbornene-2,3-dicarboximido-acetic acid.

7. A compound within the scope of claim 1, having the designation piperidide of the 2-(Δ⁵-norbornene-2,3-dicarboximido)-2-(phenyl)acetic acid.

8. A compound within the scope of claim 1, having the designation 2 - (Δ⁵-norbornene-2,3-dicarboximido)-propionamide.

9. A compound within the scope of claim 1, having the designation piperide of the 3-(Δ⁵-norbornene-2,3-dicarboximido)-propionic acid.

10. A compound within the scope of claim 1, having the designation norborane-2,3-dicarboximidoacetamide.

11. A compound within the scope of claim 1, having the designation morpholide of the norbornane-2,3-dicarboximidoacetic acid.

12. A compound within the scope of claim 1, having the designation norbornane - 2,3 - dicarboximido-acetanilide.

13. A compound within the scope of claim 1, having the designation N,N-diethylamide of the norbornane-2,3-dicarboximido-acetic acid

References Cited

Boehme, et al. J. Med. Pharm. Chem. 5: 769–75 (1962).

ALEX MAZEL, Primary Examiner

J. A. NARCAVAGE, Assistant Examiner

U.S. Cl. X.R.

260—268 C, 294 A, 326 C; 424—248, 250, 267, 274

UNITED STATES PATENT OFFICE
CERTIFICATE OF CORRECTION

PO-1050
(5/69)

Patent No. 3,651,059      Dated March 21, 1972

Inventor(s) Enrico Serino et al

It is certified that error appears in the above-identified patent and that said Letters Patent are hereby corrected as shown below:

Column 7, line 5, for "(2',6-dimethyl-piperidide" read -- (2',6'-dimethyl)-piperidide --

Signed and sealed this 11th day of July 1972.

(SEAL)
Attest:

EDWARD M. FLETCHER, JR.
Attesting Officer

ROBERT GOTTSCHALK
Commissioner of Patents